United States Patent
Krasnov et al.

(10) Patent No.: US 7,914,857 B2
(45) Date of Patent: Mar. 29, 2011

(54) METHOD OF MAKING HEAT TREATED COATED ARTICLE USING DIAMOND-LIKE CARBON (DLC) COATING AND PROTECTIVE FILM WITH OXYGEN CONTENT OF PROTECTIVE FILM BASED ON BENDING CHARACTERISTICS OF COATED ARTICLE

(75) Inventors: Alexey Krasnov, Canton, MI (US); Rudolph Hugo Petrmichl, Ann Arbor, MI (US); Jiangping Wang, Novi, MI (US); Maximo Frati, Ypsilanti, MI (US); Nestor P. Murphy, West Bloomfield, MI (US); Jose Nunez-Regueiro, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 927 days.

(21) Appl. No.: 11/806,678

(22) Filed: Jun. 1, 2007

(65) Prior Publication Data
US 2008/0182033 A1 Jul. 31, 2008

Related U.S. Application Data

(63) Continuation-in-part of application No. 11/699,080, filed on Jan. 29, 2007, now Pat. No. 7,833,574.

(51) Int. Cl.
*C23C 14/00* (2006.01)
*B05D 1/36* (2006.01)
*B05D 3/02* (2006.01)

(52) U.S. Cl. ...... 427/523; 427/401; 427/402; 427/419.2; 427/165; 427/166; 427/249.7; 427/250; 427/255.31; 427/255.33

(58) Field of Classification Search ................. 427/523, 427/401, 402, 419.2, 165, 166, 249.7, 250, 427/255.31, 255.33
See application file for complete search history.

(56) References Cited

U.S. PATENT DOCUMENTS
5,073,450 A 12/1991 Nietering
(Continued)

FOREIGN PATENT DOCUMENTS
WO WO 2005/021454 3/2005
(Continued)

OTHER PUBLICATIONS
Kyung-Hee Park et al. (Jpn. J. Appl. Phys. vol. 42 (2003) pp. 7071-7072 Part 1, No. 11, Nov. 2003).*
(Continued)

*Primary Examiner* — Nadine G Norton
*Assistant Examiner* — Mahmoud Dahimene
(74) *Attorney, Agent, or Firm* — Nixon & Vanderhye P.C.

(57) ABSTRACT

There is provided a method of making a heat treated (HT) coated article to be used in shower door applications, window applications, or any other suitable applications where transparent coated articles are desired. The method may include heat treating a glass substrate coated with at least a layer of or including diamond-like carbon (DLC) or other type of carbon, with an oxygen barrier layer provided thereon directly or indirectly. Optionally, a release layer of a material such as zinc oxide or the like may be provided between the oxygen barrier layer and the DLC. In certain example embodiments, the oxygen content of at least part of the protective film when deposited may be determined based on whether the coated surface is to be bent in a convex manner, to be bent in a concave manner, or to remain flat. Following heat treatment, which may include bending the coated surface into a convex or concave shape, and quenching, the protective film may be removed by washing or the like.

29 Claims, 6 Drawing Sheets

U.S. PATENT DOCUMENTS

| | | | |
|---|---|---|---|
| 5,135,808 A | 8/1992 | Kimock et al. | |
| 5,470,661 A | 11/1995 | Bailey et al. | |
| 5,635,245 A | 6/1997 | Kimock et al. | |
| 5,858,477 A | 1/1999 | Veerasamy et al. | |
| 5,888,593 A | 3/1999 | Petrmichl et al. | |
| 5,900,342 A | 5/1999 | Visser et al. | |
| 6,002,208 A | 12/1999 | Maishev et al. | |
| 6,180,296 B1 * | 1/2001 | Cordes et al. | 430/20 |
| 6,261,693 B1 | 7/2001 | Veerasamy | |
| 6,280,834 B1 | 8/2001 | Veerasamy et al. | |
| 6,284,377 B1 | 9/2001 | Veerasamy | |
| 6,303,225 B1 | 10/2001 | Veerasamy | |
| 6,303,226 B2 | 10/2001 | Veerasamy | |
| 6,312,808 B1 | 11/2001 | Veerasamy et al. | |
| 6,335,086 B1 | 1/2002 | Veerasamy | |
| 6,338,901 B1 | 1/2002 | Veerasamy | |
| 6,447,891 B1 | 9/2002 | Veerasamy et al. | |
| 6,461,731 B1 | 10/2002 | Veerasamy et al. | |
| 6,531,182 B2 | 3/2003 | Veerasamy et al. | |
| 6,592,992 B2 | 7/2003 | Veerasamy | |
| 6,592,993 B2 | 7/2003 | Veerasamy | |
| 6,827,977 B2 * | 12/2004 | Veerasamy | 427/249.7 |
| 6,921,579 B2 | 7/2005 | O'Shaughnessy et al. | |
| 7,060,322 B2 | 6/2006 | Veerasamy | |
| 7,067,175 B2 | 6/2006 | Veerasamy | |
| 7,150,849 B2 | 12/2006 | Veerasamy | |
| 7,507,442 B2 | 3/2009 | Veerasamy | |
| 7,622,161 B2 | 11/2009 | Veerasamy | |
| 2003/0118860 A1 | 6/2003 | O'Shaughnessy et al. | |
| 2003/0162037 A1 * | 8/2003 | Russo et al. | 428/432 |
| 2003/0170464 A1 | 9/2003 | Veerasamy | |
| 2004/0258890 A1 | 12/2004 | Miller et al. | |
| 2004/0258926 A1 | 12/2004 | Veerasamy | |
| 2005/0095430 A1 | 5/2005 | Veerasamy | |
| 2005/0095431 A1 | 5/2005 | Veerasamy | |
| 2005/0191494 A1 | 9/2005 | Veerasamy | |
| 2006/0003545 A1 | 1/2006 | Veerasamy | |
| 2006/0057294 A1 | 3/2006 | Veerasamy et al. | |
| 2006/0166009 A1 | 7/2006 | Veerasamy | |
| 2007/0231553 A1 | 10/2007 | Hartig et al. | |
| 2008/0182123 A1 | 7/2008 | Murphy et al. | |

FOREIGN PATENT DOCUMENTS

WO    WO 2007/112229    10/2007

OTHER PUBLICATIONS

U.S. Appl. No. 11/699,080, filed Jan. 29, 2007.
U.S. Appl. No. 11/798,920, filed May 17, 2007.
U.S. Appl. No. 11/806,674, filed Jun. 1, 2007; Krasnov et al.
U.S. Appl. No. 12/230,55, filed Aug. 29, 2008; Petrmichl et al.
U.S. Appl. No. 11/984,542, filed Nov. 19, 2007, Murphy et al.
U.S. Appl. No. 12/219,770, filed Jul. 28, 2008; Sol.
"Hybrid AC EL Structures with Thin Protective ZnO Film", Tsvetkova et al., Journal of Physics: Conference Series 113 (2008) pp. 1-4.
"Feasibility Study of RF Sputtered ZnO Film for Surface Micromachining", Bhatt et al., Surface & Coatings Technology, 198 (2005) pp. 304-308.
"Low-Emissivity Coating of Amorphous Diamond-Like Carbon/Ag-Alloy Multilayer on Glass" Chiba et al., Applied Surface Science 246 (2005) pp. 48-51.

* cited by examiner

METHOD OF MAKING HEAT TREATED COATED ARTICLE USING DIAMOND-LIKE CARBON (DLC) COATING AND PROTECTIVE FILM WITH OXYGEN CONTENT OF PROTECTIVE FILM BASED ON BENDING CHARACTERISTICS OF COATED ARTICLE

This application is a continuation-in-part (CIP) of U.S. Ser. No. 11/699,080, filed Jan. 29, 2007, published as (US 2008/0182123), now (U.S. Pat. No. 7,833,574), the entire disclosure of which is hereby incorporated herein by reference.

Certain embodiments of this invention relate to a method of making a heat treated (HT) coated article to be used in shower door applications, window applications, tabletop applications, or any other suitable applications. For example, certain embodiments of this invention relate to a method of making a coated article including a step of heat treating a glass substrate coated with at least a layer comprising diamond-like carbon (DLC) and an overlying sacrificial protective film thereon. In certain example embodiments, the protective film may be of or include an oxygen blocking or barrier layer for protecting the DLC during heat treatment (e.g., thermal tempering). Optionally, a release layer may be provided between the DLC and the barrier layer. In certain example embodiments, the oxygen content of the oxygen blocking or barrier layer when deposited is determined based on whether the coated surface is to be bent in a convex manner, to be bent in a concave manner, or to remain flat. Following and/or during heat treatment (e.g., thermal tempering, or the like) the protective film may be entirely or partially removed by washing or the like. Other embodiments of this invention relate to the pre-HT coated article, or the post-HT coated article.

BACKGROUND OF THE INVENTION

Coated articles such as transparent shower doors and IG window units are often heat treated (HT), such as being thermally tempered, for safety and/or strengthening purposes. For example, coated glass substrates for use in shower door and/or window units are often heat treated at a high temperature(s) (e.g., at least about 580 degrees C., more typically from about 600-650 degrees C.) for purposes of tempering.

Diamond-like carbon (DLC) is sometimes known for its scratch resistant properties. For example, different types of DLC are discussed in the following U.S. Pat. Nos. 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and 5,470,661, all of which are hereby incorporated herein by reference.

It would sometimes be desirable to provide a window unit or other glass article with a protective coating including DLC in order to protect it from scratches and the like. Unfortunately, DLC tends to oxidize and burn off at temperatures of from approximately 380 to 400 degrees C., as the heat treatment is typically conducted in an atmosphere including oxygen. Thus, it will be appreciated that DLC as a protective overcoat cannot withstand heat treatments (HT) such as thermal tempering, heat strengthening, heat bending or the like at the extremely high temperatures described above which are often required in the manufacture of vehicle windows, IG window units, glass table tops, shower doors, and/or the like.

Accordingly, those skilled in the art will appreciate that a need in the art exists for a method of providing heat treated (HT) coated articles with a protective coating (one or more layers) comprising DLC. A need for corresponding coated articles, both heat treated and pre-HT, also exists.

BRIEF SUMMARY OF EXAMPLES OF INVENTION

Certain example embodiments of this invention relate to a method of making a heat treated (HT) coated article to be used in shower door applications, window applications, tabletop applications, or any other suitable application. For example, certain embodiments of this invention relate to a method of making a coated article including a step of heat treating a glass substrate coated with at least a layer comprising diamond-like carbon (DLC) and an overlying sacrificial protective film thereon. In certain example embodiments, the protective or sacrificial oxygen barrier film may be of or include a layer of or including $SnO_x$, $SnSbO_x$ or the like (where x is from about 0.75 to 1.5, more preferably from about 0.8 to 1.3, and even more preferably from about 0.9 to 1.2, with an example being about 1). Optionally, a release layer of a material such as zinc oxide may be provided between the oxygen barrier film and the DLC.

Following and/or during heat treatment (e.g., thermal tempering, or the like) at least some of and preferably much of the $SnO_x$ or the like transforms into $SnO_y$ or the like (where y is from about 1.6 to 2.2, more preferably from about 1.7 to 2.1, and even more preferably from about 1.9 to 2.05, with an example being about 2). Due to or after exposure to the heat treating temperatures, the tin oxide of the sacrificial film oxidizes and the additional oxygen atoms arriving from the ambient air increases the volume of the material of the sacrificial film, so that internal stress is created in the layer and/or film due to the $SnO_x$ to $SnO_y$ transition in the sacrificial film. Then, during glass quenching (e.g., part of the tempering process), stress relief may occur which causes the layer to buckle, creating numerous deep cracks on its surface which may act as water or liquid channels that permit the sacrificial film to be easily removed (partially or entirely) from the DLC and glass substrate via washing or the like.

Coated articles in different example embodiments of this invention may be flat or bent into a curved (convex and/or concave) shape. The heat bending may take place during the heat treating (HT) portion of a thermal tempering process in certain example embodiments of this invention.

In certain example embodiments, the oxygen content of the oxygen blocking or barrier layer when deposited is determined based on whether the coated surface is to be bent in a convex manner, to be bent in a concave manner, or to remain flat. When a convex coated surface is created by bending during a heat treating portion of tempering, an additional external tensile stress is added to the internal stress of the film. However, when a concave coated surface is created by bending during tempering, an additional external compressive stress is added to the internal stress of the film. In order to take into account these additional stresses caused by bending the coated glass, certain example embodiments of this invention determine the amount that the oxygen barrier layer is to be oxidized upon deposition thereof based on whether the coated article is to be bent so as to have a convex or concave coated surface. When the coated glass is to be flat or to be bent to have a convex coated surface, the oxygen barrier layer is deposited so as to have a relatively low oxygen content. However, when the coated glass is to be bent to have a concave coated surface, the oxygen barrier layer is deposited so as to have a relatively higher oxygen content. Oxiding the oxygen barrier layer to a degree based on whether the coated article is going to ultimately be flat, have a convex coated surface, or have a concave coated surface, is advantageous in that the additional external bending stresses can be taken into account to help ensure that total stress in the protective film does not become too large so that the film does not lose its integrity during tempering and/or bending and can adequately protect the DLC against burnoff during the same.

In certain example embodiments of this invention, there is provided a method of making a heat treated coated article, the method comprising: providing a glass substrate; forming at least one scratch resistant layer on the glass substrate; forming a protective film on the glass substrate over at least the scratch resistant layer thereby forming a coated surface of the glass substrate; determining whether the coated surface of the glass substrate is to be bent in a convex manner, to be bent in a concave manner, or to remain flat during heat treating; and wherein the protective film is formed on the glass substrate over at least the scratch resistant layer so that oxygen content of at least part of the protective film as deposited is determined based on whether or not the coated surface of the glass substrate is to be bent in a convex manner, to be bent in a concave manner, or to remain flat during heat treating; and heat treating the glass substrate with the scratch resistant layer and the protective film thereon so that during the heat treating the protective film prevents significant burnoff and/or degradation of the scratch resistant layer, wherein the heat treating comprises heating the glass substrate to temperature(s) sufficient for thermal tempering and/or heat bending.

In other example embodiments of this invention, there is provided a method of making a heat treated coated article, the method comprising: providing a glass substrate; forming at least one layer comprising diamond-like carbon (DLC) on the glass substrate; forming a protective film on the glass substrate over at least the layer comprising DLC thereby forming a coated surface of the glass substrate; determining whether the coated surface of the glass substrate is to be bent in a convex manner, to be bent in a concave manner, or to remain flat during heat treating; wherein the protective film is formed on the glass substrate over at least the layer comprising DLC in a manner so that oxygen content of at least part of the protective film as deposited is determined based on whether or not the coated surface of the glass substrate is to be bent in a convex manner, to be bent in a concave manner, or to remain flat during heat treating; heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering and/or heat bending.

BRIEF DESCRIPTION OF THE DRAWINGS

FIG. 4 is a photograph of cracks formed in the sacrificial film caused by stress relief may occur due to quenching or the like, such crack(s) may act as water or liquid channels that permit the sacrificial film to be easily removed (partially or entirely) from the DLC and glass substrate via washing or the like.

DETAILED DESCRIPTION OF EXAMPLE EMBODIMENTS OF THE INVENTION

Figure 1:
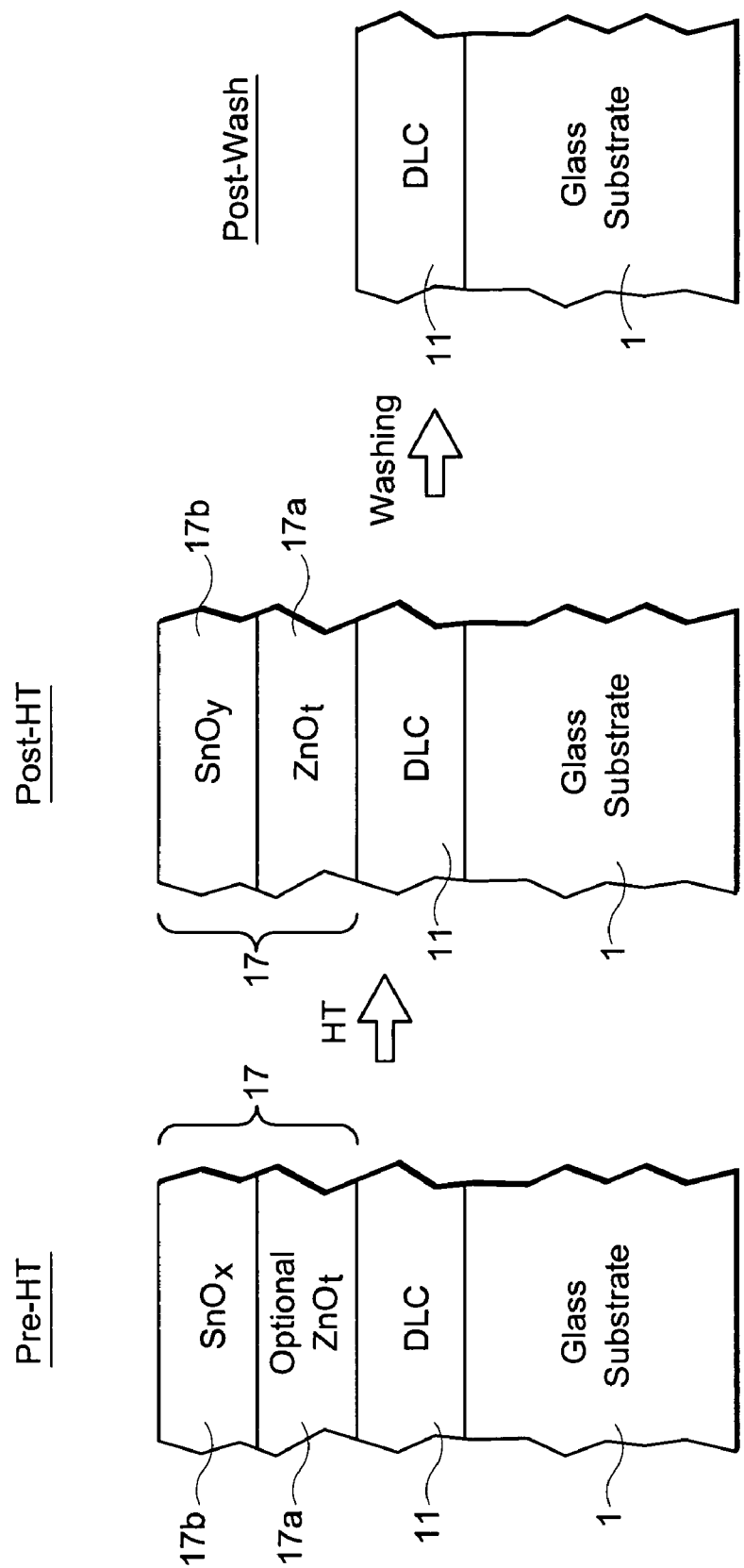
FIG. 1 is a schematic cross sectional view of a coated article, prior to and following heat treatment and washing, according to an example embodiment of this invention.

Referring now more particularly to the accompanying drawings in which like reference numerals indicate like parts throughout the several views.

Certain example embodiments of this invention relate to methods of making coated articles that may use heat treatment (HT), wherein the coated article includes a coating (one or more layers) including diamond-like carbon (DLC). In certain instances, the HT may involve heating a supporting glass substrate, with the DLC thereon, to or in a temperature (s) of from 550 to 800 degrees C., more preferably from 580 to 800 degrees C. (which is well above the burn-off temperature of DLC). In particular, certain example embodiments of this invention relate to a technique for allowing the DLC to withstand such HT without significantly burning off during the same. In certain embodiments, a sacrificial protective film is formed on the glass substrate over the DLC so as to reduce the likelihood of the DLC burning off during HT. Thus, the majority (if not all) of the DLC remains on the glass substrate, and does not burn off, during the HT. Following HT, the sacrificial protective film (which may include one or more layers) may or may not be removed in different embodiments of this invention.

In certain example embodiments, the protective or sacrificial film may be of or include an oxygen blocking or barrier layer 17b of or including $SnO_x$ or $SnSbO_x$ (where x is from about 0.75 to 1.5, more preferably from about 0.8 to 1.3, and even more preferably from about 0.9 to 1.2, with an example being about 1; these x values may be applicable for example at least when the final coated article is to be flat or substantially flat). The tin oxide based film 17b may be amorphous, crystalline, or a mixture thereof, in different example embodiments of this invention, and may be deposited in any suitable manner (e.g., by pyrolysis, sputtering, or other suitable technique). Optionally, a release layer 17a of a material such as zinc oxide may be provided between the $SnO_x$ and the DLC. The example optional underlayer 17a of the sacrificial film 17 may be of a softer material (e.g., oxide of Zn, such as a suboxide thereof) than the film 17b, with the underlayer 17a facilitating the film 17 washing off while maintaining its integrity during heat treating. An example advantage of using distinct and different oxygen-blocking and release layers in film 17 is that each layer (17a and 17b) can be optimized for its intended function. Consequently, the optimized performance of the film 17 may be improved and it can be made thinner if desired. In certain example embodiments, following heat treatment (HT) the DLC inclusive layer 11 protects against abrasion and corrosion, and against adhesion of minerals in hard water (e.g., has good hard water cleanability).

In certain example embodiments, the total thickness of the entire sacrificial film 17 (including both layers 17a and 17b, or possibly only film 17b when layer 17a is omitted) is from about 100 to 20,000 Å, more preferably from about 5,000 to 15,000 Å, even more preferably from about 5,000 to 11,000 Å.

Following and/or during heat treatment (e.g., thermal tempering, or the like), in sacrificial layer 17b at least some of and preferably much of the $SnO_x$ transforms into $SnO_y$ (where y is from about 1.6 to 2.2, more preferably from about 1.7 to 2.1, and even more preferably from about 1.9 to 2.05, with an example being about 2; these y values may be applicable for example at least when the final coated article is to be flat or substantially flat). Due to or after exposure to the heat treating temperatures, the tin oxide of the sacrificial film 17b oxidizes and the additional oxygen atoms arriving from the ambient air increases the volume of the material of the sacrificial film 17b, so that internal stress is created due to the $SnO_x$ to $SnO_y$ transition in the sacrificial film 17b. Then, during thermal quenching (e.g., part of the glass tempering process involving cooling with cold air or the like), stress relief may occur which causes the layer 17b (and optionally 17a) to buckle, creating numerous deep cracks on its surface which may act as water or liquid channels that permit the sacrificial film 17b (and optionally 17a) to be easily removed (partially or entirely) from the DLC 11 and glass substrate 1 via washing or the like.

Figure 4:
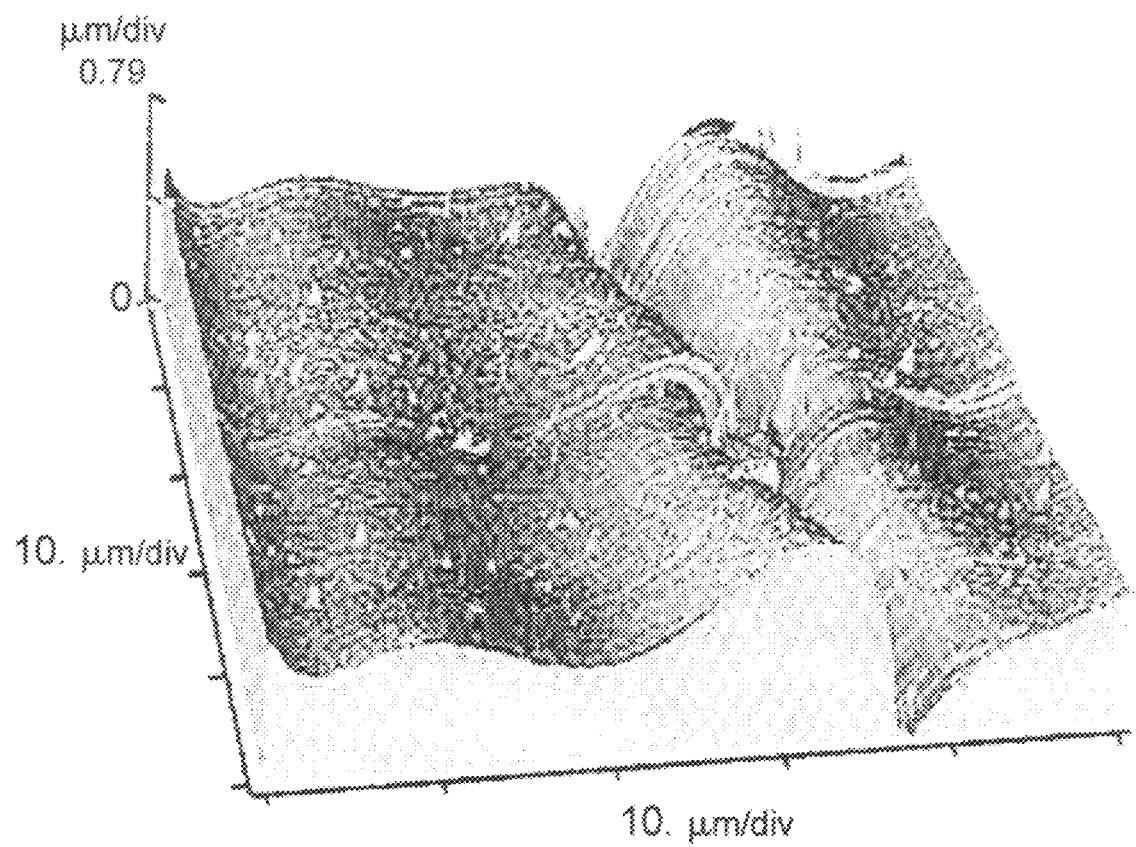

Thus, it will be appreciated that the material (e.g., tin oxide) chosen for the sacrificial film 17b is chosen in such a way as to protect the underlying DLC 11 from oxidation during high-temperature heat treating (e.g., one part of thermal tempering) and then to buckle during quenching by cold air and/or liquid (e.g., a subsequent part of thermal tempering). The material of choice (e.g., tin oxide, possibly doped with a material such as Sb or the like) has monoxide (SnO) and dioxide ($SnO_2$) states, with the transition therebetween due to tempering causing formation of substantial stress in the film, which is relieved during the quenching thereby causing the cracking/buckling. When tin oxide is used for film 17b, it may or may not be doped with other material(s) such as Sb, F, and/or the like. An example crack in the post-HT and post-quenching film 17b is shown in FIG. 4. It will be appreciated that sacrificial film 17a is preferably substoichiometric prior to HT, and its level of oxidation is chosen in such a way as to substantially maintain an optimum balance between the protective properties of the film 17b and its readiness to be removed during washing following HT.

Figure 5:
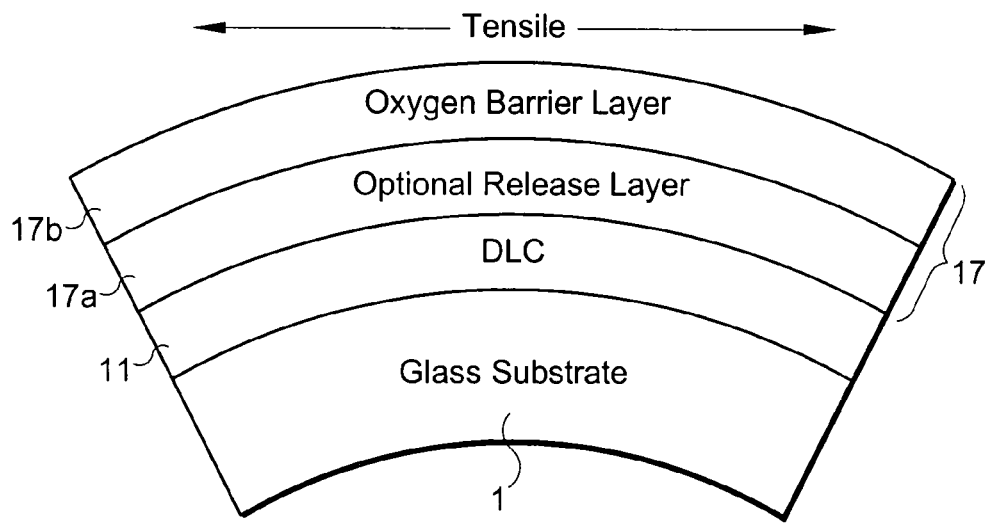
FIG. 5 is a schematic cross sectional view of a coated article according to an example embodiment of this invention.
Figure 6:
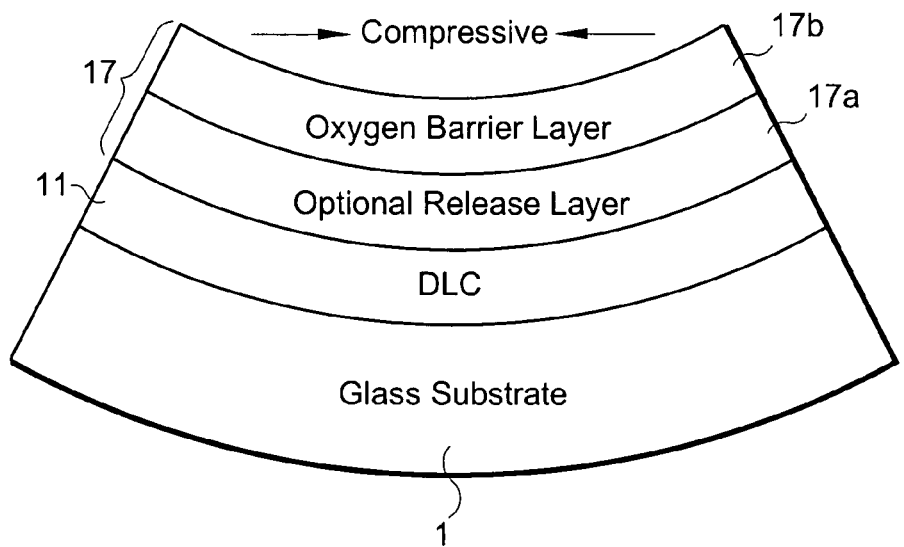
FIG. 6 is a schematic cross sectional view of a coated article according to an example embodiment of this invention.

The abrupt transition or transformation from $SnO_x$ to $SnO_y$ during tempering and/or heat bending causes the creation of internal stress. Upon quenching of the article, the stress is relieved and the film 17 can be washed off. However, additional challenges are introduced when the coated article is to be bent so that the coated surface is either concave or convex (e.g., in curved window or shower door applications, or in curved vehicle window applications) as shown in FIGS. 5-6. When a convex coated surface is created by bending the coated flat glass during tempering, an additional external tensile stress is added to the internal stress of the film 17 (see FIG. 5). However, when a concave coated surface is created by bending the coated flat glass during tempering, an additional external compressive (as opposed to tensile) stress is added to the internal stress of the film 17 (see FIG. 6).

Still referring to FIGS. 5-6, the bending of the coated glass takes place during thermal tempering and/or heat treating. Thus, there are two simultaneous processes, namely the increase of external stress (either tensile or compressive, depending on when the coated substrate is being bent to cause the coated surface to be convex or concave) and the increase of internal stress in the film 17 (or layer 17b) due to the saturation of the layer 17b with oxygen molecules from the ambient atmosphere. In order to take into account these stresses caused by bending the coated glass, certain example embodiments of this invention determine the amount that layer 17b is oxidized (upon deposition thereof, prior to HT) based on whether the coated article is to be flat, or is to have a convex or concave coated surface. In the case of a convex coated surface (see FIG. 5), the layer 17b is deposited (via sputtering, pyrolysis or the like) in an underoxidized manner (i.e., to have a low level of oxidation). In other words, when the glass 1 is to be flat or be bent to have a convex coated surface as shown in FIG. 5, the layer 17b is deposited so as to have a relatively low oxygen content. In this case, the material is porous and enough space is left which can be filled by oxygen during tempering; at the same time the volume of the material expands due to incoming oxygen during tempering and bending (creation of compressive stress), the convex bending creates an external tensile stress. The total stress, therefore, is reduced or minimized and the film 17 does not lose its integrity during the tempering or bending process thereby allowing it to adequately protect the DLC 11 against burnoff.

In the case of a concave coated surface, the situation is the opposite. Thus, when the glass 1 is to be bent to have a concave coated surface as shown in FIG. 6, the layer 17b is deposited so as to have a relatively high oxygen content so that there are no or fewer channels for extra oxygen and there is no or reduced extra contribution of internal film stress during the bending. The total compressive stress, therefore, is not as great as it would be in the case where a layer 17b with low oxygen content was initially deposited.

FIG. 1 is a schematic cross sectional view of a coated article, before and after heat treatment, according to an example embodiment of this invention. Typically, the coated article on the left side of FIG. 1 exists during a stage of manufacture prior to heat treatment (HT), but may also exist post-HT in certain instances. The coated article shown at the left side of FIG. 1 includes a flat or substantially flat glass substrate 1, DLC inclusive layer 11, and sacrificial protective film 17 which may include one or more layers. In certain example embodiments, the protective film 17 includes first and second layers 17a and 17b. Glass substrate 1 is typically of or includes soda-lime-silica glass, although other types of glass may be used in certain instances.

Layers 17a and/or 17b may be deposited on the flat or substantially flat glass substrate 1 via sputtering, pyrolysis, or any other suitable technique. For example, as one non-limiting example, optional zinc oxide based layer 17a may be sputter-deposited using from about 3-15 (e.g., 10) sccm/kW (regarding content of oxygen gas flow power), and an argon to oxygen gas ratio of from about 2 to 5, whereas tin oxide based layer 17b may be sputter-deposited using an oxygen to argon gas ratio of from about 0.1 to 1.0, more preferably from about 0.5 to 1.0, and most preferably from about 0.5 to 0.8, and oxygen power of from about 20-60 sccm/kW. Pressure may be from about 0.5 to 8 mTorr in deposition conditions for layer 17a and/or 17b in certain example embodiments.

Note that zinc oxide layer 17a may be doped with other materials such as Al, N, Zr, Ni, Fe, Cr, Ti, Mg, mixtures thereof, or the like, in certain example embodiments of this invention. Also note that layer 17b may be of $SnSbO_x$ instead of $SnO_x$ in certain example embodiments of this invention, with the same x and y values applying as discussed herein. In certain example embodiments of this invention, oxygen barrier layer 17b may include from about 0-12% Sb, sometimes from about 0.5 to 10% Sb, possibly from about 1-8% Sb, and still more possibly from about 2-7% Sb (the remainder of the layer may be made up of tin oxide or the like in different example instances).

DLC inclusive layer 11 may be from about 5 to 1,000 angstroms (Å) thick in certain example embodiments of this invention, more preferably from 10-300 Å thick, and most preferably from 20 to 65 Å thick, possibly from about 25-50 Å thick, with an example thickness being about 30 angstroms. In certain example embodiments of this invention, DLC layer 11 may have an average hardness of at least about 10 GPa, more preferably at least about 20 GPa, and most preferably from about 20-90 GPa. Such hardness renders layer(s) 11 resistant to scratching, certain solvents, and/or the like. Layer 11 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC type or any other suitable type of DLC may include from 1 to 30% hydrogen, more preferably from 5-20% H, and most preferably from 10-20% H. This t-aC type of DLC includes more $sp^3$ carbon-carbon (C—C) bonds than $sp^2$ carbon-carbon (C—C) bonds. In certain example embodiments, at least about 30% or 50% of the carbon-carbon bonds in DLC layer 11 may be sp carbon-carbon (C—C) bonds, more preferably at least about 60% of the carbon-carbon bonds in the layer 11 may be $sp^3$ carbon-carbon (C—C) bonds, and most preferably at least about 70% of the carbon-carbon bonds in the layer 11 may be $sp^3$ carbon-carbon (C—C) bonds. In certain example embodiments of this invention, the DLC may have an average density of at least about 2.4 $gm/cm^3$, more preferably at least about 2.7 $gm/cm^3$. Example linear ion beam sources that may be used to deposit DLC inclusive layer 11 on substrate 1 include any of those in any of U.S. Pat. Nos. 6,261,693, 6,002,208, 6,335,086, or 6,303,225 (all incorporated herein by reference). When using an ion beam source to deposit layer(s) 11, hydrocarbon feedstock gas(es) (e.g., $C_2H_2$), HMDSO, or any other suitable gas, may be used in the ion beam source in order to cause the source to emit an ion beam toward substrate 1 for forming layer(s) 11. It is noted that the hardness and/or density of layer(s) 11 may be adjusted by varying the ion energy of the depositing apparatus.

DLC layer 11 allows the coated article to be more scratch resistant than if the DLC 11 were not provided. It is noted that while layer 11 is on glass substrate 1 in certain embodiments of this invention, additional layer(s) may or may not be under layer 11 between the substrate 1 and layer 11 in certain example embodiments of this invention. Thus, the phrase "on the substrate" as used herein is not limited to being in direct contact with the substrate as other layer(s) may still be provided therebetween.

For example and without limitation, the layer 11 of or including DLC may be any of the DLC inclusive layers of any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; or 5,470,661 (all of these patents hereby being incorporated herein by reference), or alternatively may be any other suitable type of DLC inclusive layer. DLC inclusive layer 11 may be hydrophobic (high contact angle), hydrophilic (low contact angle), or neither, in different embodiments of this invention. The DLC 11 may or may not include from about 5-30% Si, more preferably from about 5-25% Si, and possibly from about 10-20% Si in certain example embodiments of this invention. Hydrogen may also be provided in the DLC in certain instances.

Sacrificial protective film 17, of one or more layers, is provided in order to protect DLC layer 11 during HT. If film 17 were not provided, the DLC 11 would significantly oxidize during HT and burn off, thereby rendering the final product defenseless against scratching. However, the presence of sacrificial protective film 17 prevents or reduces the amount of oxygen which can reach the DLC 11 during HT from the surrounding atmosphere, thereby preventing the DLC from significantly oxidizing during HT. As a result, after HT, the DLC inclusive layer 11 remains on the glass substrate 1 in order to provide scratch resistance and/or the like. In certain example embodiments, the protective film 17 includes both an oxygen blocking or barrier layer 17b, and a release layer 17a.

In the FIG. 1 example embodiment of this invention, the protective film 17 includes a first zinc inclusive release layer 17a and a second tin oxide inclusive oxygen blocking and/or barrier layer 17b. The first zinc inclusive layer 17a may be metallic, substantially metallic, or substoichiometric zinc oxide in different example embodiments of this invention; whereas the second tin oxide inclusive layer 17b may be of or including tin oxide as discussed above in certain example embodiments of this invention. In certain example embodiments, layers 17a and 17b are both substoichiometric. Thus, optional layer 17a is able to function as a release layer whereas layer 17b is able to function as an oxygen blocking or barrier layer. An oxygen "blocking" or "barrier" layer means that the layer blocks significant amounts of oxygen from reaching the DLC during HT. It is noted that while layer 17b is of or include tin oxide in certain example embodiments, it is possible to use a different material (e.g., different metal M oxide) for layer 17b that is capable of existing in different stoichiometric states such as having a monoxide form and a dioxide form, so that the transition from one to the other due to HT can cause the formation of stress discussed herein.

In certain example embodiments of this invention, layer 17a may be of or include $ZnO_t$ and layer 17b may be of or include $SnO_x$ (x may be greater than or equal to tin certain example embodiments). In certain example embodiments of this invention, t is from about 0 to 0.9, more preferably from about 0.1 to 0.9, even more preferably from about 0.1 to 0.8, and possibly from about 0.1 to 0.7. Meanwhile, in certain example embodiments, x may be from about 0.75 to 1.5, more preferably from about 0.8 to 1.3, and even more preferably from about 0.9 to 1.2, with an example being about 1.

Advantageously, it has been found that the use of substoichiometric zinc oxide layer 17a surprisingly permits more efficient and easier removal of the protective film 17 during and/or following heat treatment (HT). In other words, optional layer 17a may function as at least a release layer. The different materials and compositions of zinc oxide inclusive layer 17a and tin oxide inclusive barrier layer 17b are used to cause different stresses in layers 17a and 17b, which stresses are manipulated so as to allow the film 17 to be more easily removed during and/or following HT.

Following and/or during heat treatment (e.g., thermal tempering, or the like), in sacrificial layer 17b at least some of and preferably much of the $SnO_x$ transforms into $SnO_y$ so that y is greater than x (e.g., where y is from about 1.6 to 2.2, more preferably from about 1.7 to 2.1, and even more preferably from about 1.9 to 2.05, with an example being about 2). See the middle portion of FIG. 1 in this respect, which is after HT. Due to or after exposure to the heat treating temperatures, the tin oxide of the sacrificial film 17b oxidizes and the additional oxygen atoms arriving from the ambient air increases the volume of the material of the sacrificial film 17b, so that internal stress is created due to the $SnO_x$ to $SnO_y$ transition in the sacrificial film 17b. Then, during thermal quenching (e.g., part of the glass tempering process involving cooling with cold air or the like), stress relief may occur which causes the layer 17b (and optionally 17a) to buckle, creating numerous deep cracks on its surface which may act as water or liquid channels that permit the sacrificial film 17b (and optionally 17a) to be easily removed (partially or entirely) from the DLC 11 and glass substrate 1 via washing or the like. An example crack in layer 17b is shown in FIG. 4.

Following HT, zinc oxide based layer 17a is more metallic than is $SnO_y$ based layer 17b. The more metallic zinc oxide based layer 17a may be considered a release layer for allowing the film 17 to be easily removed from the DLC or substrate during and/or after HT due to its reduced or no oxygen content, whereas the less metallic (and more oxided) tin oxide based layer 17b may be considered an oxygen blocking or barrier layer that reduces or prevents the DLC from burning off and/or oxidizing during HT. Zinc oxide is an advantageous material for optional layer 17a because it can be easily removed (e.g., using water and/or vinegar) during and/or following HT in a non-toxic manner. Moreover, tin oxide and zinc oxide are also advantageous for use in protective film 17 because the Sn and Zn in film 17 may act as a getter for oxygen during HT thereby preventing or reducing the likelihood of the DLC burning off during such HT. It is noted that upper layer 17b may partially burn off during HT in certain example embodiments of this invention.

Following the quenching, the film 17 may be washed off using water and/or vinegar, or other suitable liquid, with the resulting product being shown as including the glass substrate 1 and DLC based layer 11 as shown at the right-hand portion of FIG. 1. The resulting coated article at the right hand side of FIG. 1 (and FIGS. 2-3) may be flat or bent in different example embodiments of this invention.

Figure 2:
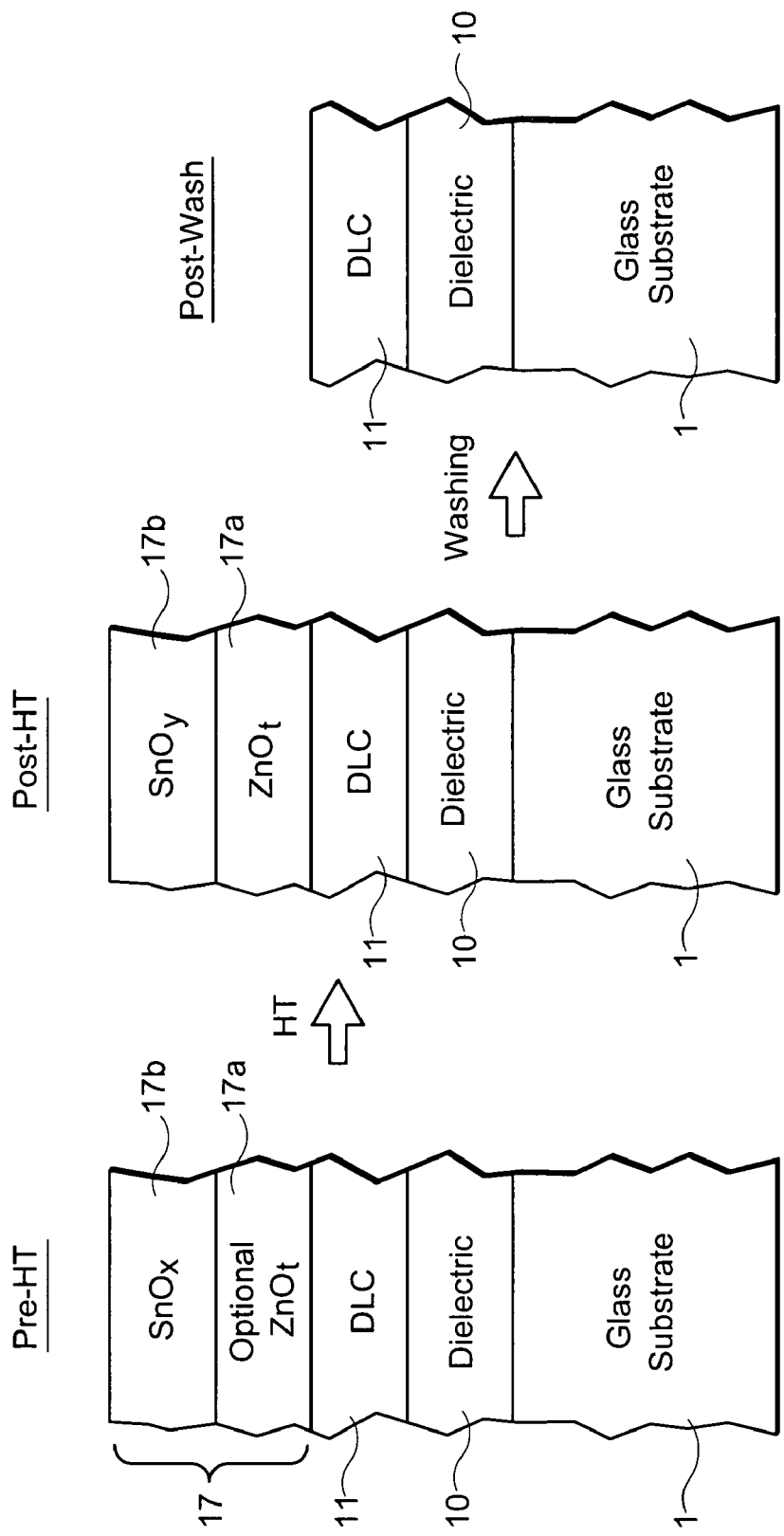
FIG. 2 is a schematic cross sectional view of a coated article, prior to and following heat treatment and washing, according to another example embodiment of this invention.

FIG. 2 illustrates another example embodiment of this invention. The FIG. 2 embodiment is the same as the FIG. 1 embodiment discussed above, except that in the FIG. 2 embodiment a barrier layer 10 is provided between the glass substrate 1 and the DLC inclusive layer 11. Barrier layer 10 may be a dielectric in certain example embodiments of this invention. Optional barrier layer 10 is for preventing or reducing oxygen and/or sodium (Na) from migrating from the glass 1 into the DLC 11 during HT. In this respect, such an optional barrier layer 10 may improve the overall optical characteristics of the coated article post-HT. Barrier layer 10 may be of or include silicon oxide, silicon nitride, silicon oxynitride, and/or the like, although other barrier materials may also be used. Barrier layer(s) 10 is formed on the glass substrate 1 via sputtering, or via any other suitable technique. Barrier layer 10 may be from about 10 to 1,000 Å thick in certain example embodiments, more preferably from 50 to 500 Å thick, and most preferably from 50 to 200 Å thick. It is noted that a barrier layer(s) 10 may also be provided in other example embodiments of this invention, for instance in the FIG. 3 embodiment between the DLC 11 and the glass substrate 1.

Figure 3:
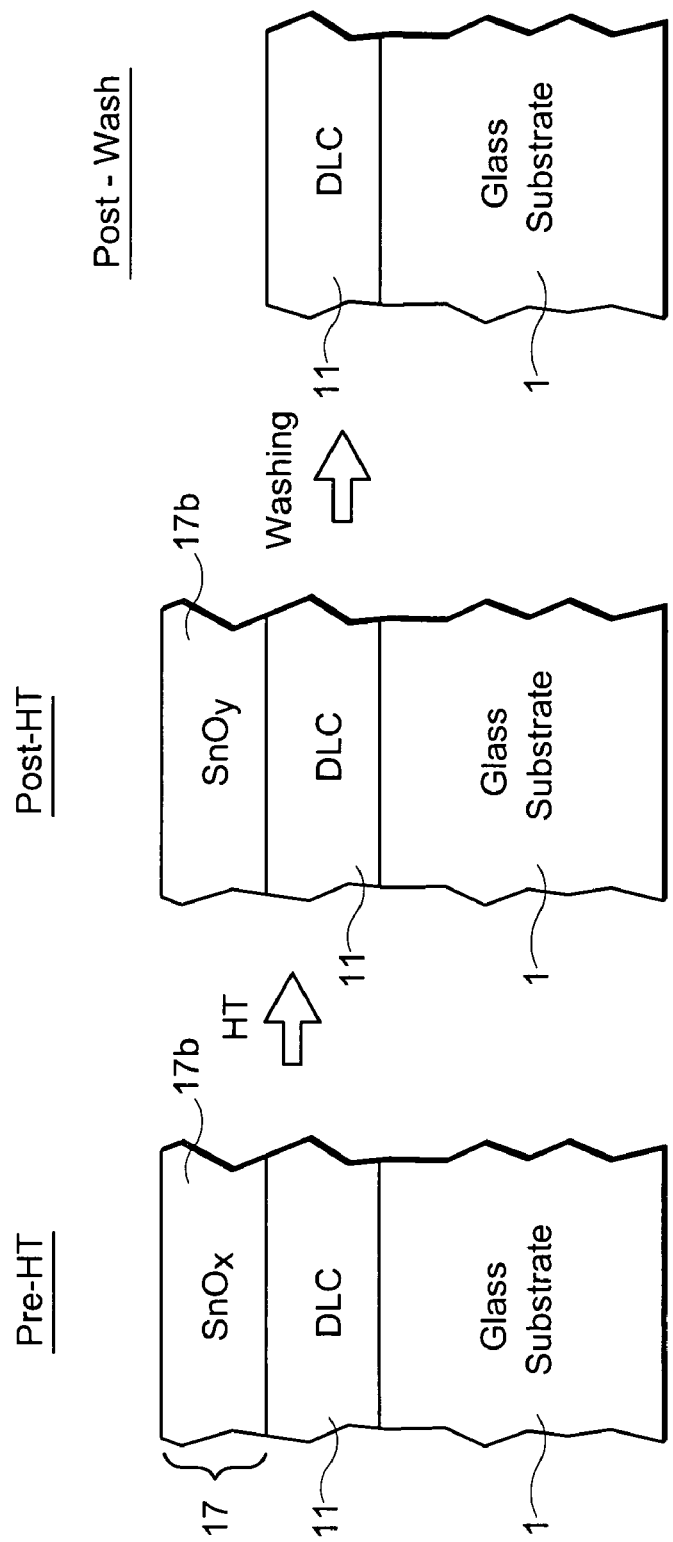
FIG. 3 is a schematic cross sectional view of a coated article, prior to and following heat treatment and washing, according to yet another example embodiment of this invention.

FIG. 3 illustrates another example embodiment of this invention. The FIG. 3 embodiment is the same as the FIG. 1 embodiment (or even the FIG. 2 embodiment if barrier layer 10 is used, which may be the case in the FIG. 3 embodiment), except that in the FIG. 3 embodiment the release layer 17a is omitted.

An example process of manufacturing a coated article will now be described, with reference to FIGS. 1-3. Initially, glass substrate 1 is provided, and at least one barrier layer 10 (e.g., silicon oxide, silicon nitride, silicon oxynitride, or the like) may optionally be sputtered on a surface thereof. Optionally, a multi-layer solar control coating (not shown) may be deposited (e.g., via sputtering) on the surface of the glass substrate 1 opposite the barrier layer 10. At least one layer 11 of or including DLC is deposited (e.g., via ion beam deposition) on the glass substrate 1, over at least the optional barrier layer 10 if present. Then, protective film 17, e.g., including layers 17a and 17b (or optionally just layer 17b), is deposited on the substrate 1 over the DLC inclusive layer 11. Protective film 17 may be deposited via sputtering, CVD, ion beam deposition, pyrolysis, or any other suitable technique. Optionally, a thin protective layer comprising DLC, silicon nitride, aluminum nitride, or silicon aluminum nitride (not shown), may be provided over sacrificial film 17 prior to HT, for durability and/or oxygen barrier purposes.

As shown in FIGS. 1-3, the glass substrate 1 with films 10 (optional), 11 and 17 thereon is then heat treated (HT) for purposes of thermal tempering, heat bending, heat strengthening, and/or the like. At least part of this HT may be conducted, for example, in an atmosphere including oxygen as known in the art at temperature(s) of from 550 to 800 degrees C., more preferably from 580 to 800 degrees C. (i.e., temperature(s) above the burn-off temperature of DLC). The HT may last for at least one minute, more preferably from 1-10 minutes, in certain example non-limiting embodiments of this invention. During HT, the presence of protective film 17 protects DLC inclusive layer 11 from the HT and prevents layer 11 from significantly oxidizing and/or burning off due to significant oxidation during the HT. While in some instances some of layer 11 may burn off during HT, the majority if not all of DLC inclusive layer 11 remains on the substrate 1 even after the HT due to the presence of sacrificial protective film 17.

An example advantage associated with using tin oxide and/or zinc oxide in film 17 is its ease of removal after HT. Protective layers such as silicon nitride are sometime undesirable since they require complex etching in order to remove the same after HT. On the other hand, it has been found that when film 17 is made of zinc, zinc oxide and/or tin oxide, soluble in vinegar and/or water (possibly only water with no vinegar required in certain preferred embodiments), the application of vinegar and/or water allows portions of film 17 remaining after HT to be easily removed in a non-toxic manner. Again, in certain example embodiments, it is possible to remove the film 17 with only water and/or vinegar in certain instances, which is advantageous from a cost and processing point of view. In certain example instances, rubbing with such liquids may be especially beneficial in removing film 17 after HT when the coated article is still warm therefrom (e.g., when the film 17 is from about 80-200 degrees C., more preferably from about 100-180 degrees C.; although the removal of film 17 may also take place at room temperature in certain example embodiments).

After film 17 has been removed, the remaining coated article is shown at the right side of FIGS. 1-3 (flat or bent), and includes an outer layer comprising scratch resistant DLC. The aforesaid processes are advantageous in that they provide a technique for allowing a coated article including a protective DLC inclusive layer 11 to be heat treated without the DLC layer 11 burning off during such HT. In other words, it becomes possible to provide a protective DLC inclusive layer 11 on a heat treated (e.g., thermally tempered) product in a commercially acceptable manner.

While zinc or zinc oxide (which may or may not be doped with other material(s) such as Al or the like) is used for the release layer 17a in certain example embodiments, other materials may instead be used for layer 17a. For instance, the release layer 17a may be or any suitable material that dissolves or readily reacts with water, vinegar, or bleach. Release layer 17a may have a melting point (or dissociation temperature) above 580 or 600 degrees C. in certain example embodiments. The release layer 17a may be of or include oxides, suboxides, nitrides and/or subnitrides of boron, titanium boride, magnesium, zinc, and mixtures thereof. Example materials for the release layer 17a in certain example embodiments are suboxides of zinc, magnesium and/or titanium boride. Note that the term "oxide" as used herein is broad enough to encompass suboxides. In certain example embodiments, release layer 17a is more dissolvable than is layer 17b in water, vinegar, bleach and/or the like. Moreover, in certain example embodiments, oxygen barrier layer 17b is more of a barrier to oxygen and/or is harder than is release layer 17a. Exemplary coatings may produce high quality post-HT and post-release DLC, with good scratch resistance and good hard water cleanability.

Figure 7:
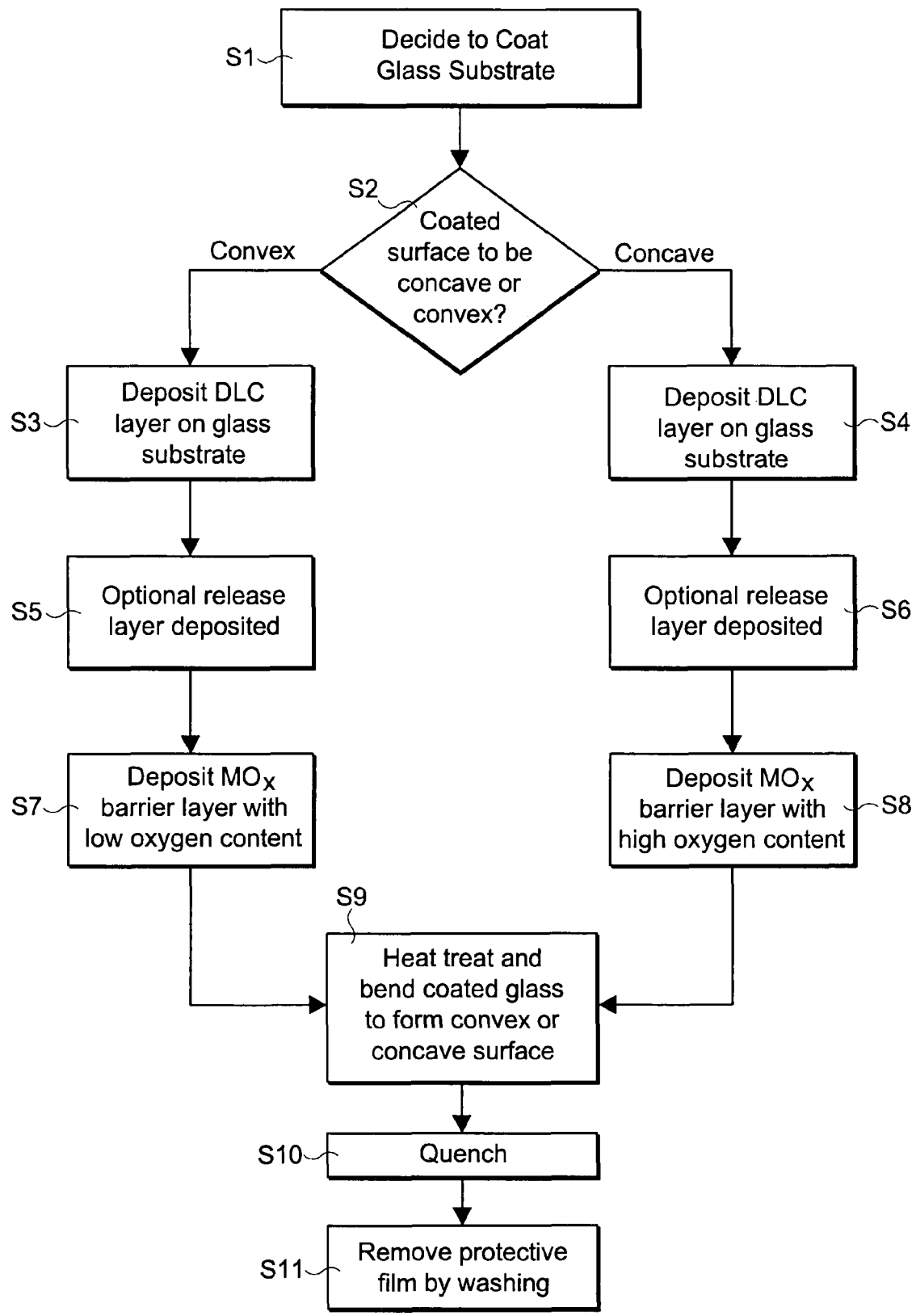
FIG. 7 is a flowchart relating to a method of making a coated article according to an example embodiment of this invention.

Referring to FIGS. 5-7, in certain example embodiments of this invention the oxygen content of the oxygen blocking or barrier layer when deposited is determined based on whether the coated surface is to be bent in a convex manner (e.g., see FIG. 5), to be bent in a concave manner (e.g., see FIG. 6), or to remain flat. Embodiments of FIGS. 5-7 may be the same as the embodiments discussed above with respect to FIGS. 1-4, except for the following exceptions. The abrupt transition or transformation from $SnO_x$ to $SnO_y$ during tempering and/or heat bending causes the creation of internal stress. Upon quenching of the article, the stress is relieved and the film 17 can be washed off. However, additional challenges are introduced when the coated article is to be bent so that the coated surface is either concave or convex (e.g., in curved window or shower door applications, or in curved vehicle window applications) as shown in FIGS. 5-6. When a convex coated surface is created by bending the coated flat glass during tempering, an additional external tensile stress is added to the internal stress of the film 17 (see FIG. 5). However, when a concave coated surface is created by bending the coated flat glass during tempering, an additional external compressive (as opposed to tensile) stress is added to the internal stress of the film 17 (see FIG. 6). The bending of the coated glass takes place during thermal tempering and/or heat treating. In order to take into account these stresses caused by bending the coated glass, certain example embodiments of this invention determine the amount that layer 17b is oxidized (upon deposition thereof, prior to HT) based on whether the coated article is to be flat, or is to have a convex or concave coated surface.

Referring to FIGS. 5-7, it is initially determined that a coated article is to be made (e.g., see S1 in FIG. 7). Then, it is determined whether the final coated article is to be flat, or is to have a coated surface to be bent in a concave or convex manner (e.g., see S2 in FIG. 7). In both cases, the DLC 11 is deposited on the glass substrate (e.g., see S3 and S4 in FIG. 7). Then, in both cases, an optional release layer 17a as discussed herein may be deposited on the glass substrate 1 over the DLC 11 if desired (e.g., see S5 and S6 in FIG. 7).

In the case of a convex coated surface (see FIG. 5), the layer 17b is deposited (via sputtering, pyrolysis or the like) in an underoxidized manner (i.e., to have a low level of oxidation) (e.g., see S7 in FIG. 7). In other words, when the glass 1 is to be flat or be bent to have a convex coated surface as shown in FIG. 5, the layer 17b is deposited so as to have a relatively low oxygen content. For example, in step S7 the film 17b may be deposited as an oxygen blocking or barrier layer of or including $SnO_x$ or $SnSbO_x$ (where x is from about 0.4 to 1.5, preferably from about 0.5 to 1.3, and even more preferably from about 0.7 to 1.2, with an example being about 1; these x values may be applicable for example at least when the coated surface is to be bent in a convex manner). In this case, the material is porous and enough space is left which can be filled by oxygen during tempering; at the same time the volume of the material expands due to incoming oxygen during tempering and bending (creation of compressive stress), the convex bending creates an external tensile stress. The total stress, therefore, is reduced or minimized and the film 17 does not lose its integrity during the tempering or bending process thereby allowing it to adequately protect the DLC 11 against burnoff.

In the case of a concave coated surface, the situation is the opposite. Thus, when the glass 1 is to be bent to have a concave coated surface as shown in FIG. 6, the layer 17b is deposited so as to have a relatively high oxygen content so that there are no or fewer channels for extra oxygen and there is no or reduced extra contribution of internal film stress during the bending (e.g., see S8 in FIG. 7). For example, when the coated surface is to be bent in a concave manner, in step S8 the barrier layer 17b may be deposited so as to be of or include $SnO_x$ or $SnSbO_x$ (where x is from about 0.85 to 2.1, more preferably from about 1 to 2, and even more preferably from about 1.4 to 2; these x values may be applicable for example at least when the coated surface is to be bent in a concave manner as shown in FIG. 6). The total compressive stress, therefore, is not as great as it would be in the case where a layer 17b with low oxygen content was initially deposited.

After the oxygen barrier layer 17b has been deposited, the glass substrate 1 with the DLC 11 and protective film 17 thereon is thermally tempered, and during the heat treating portion of the thermal tempering the coated glass substrate 1 may be bent in either a convex or concave manner (see S9 in FIG. 7). Thereafter, quenching is performed as discussed above (see S10 in FIG. 7). Finally, optionally, the protective film 17 may be removed by washing or the like as discussed above (see S11 in FIG. 7).

According to certain example embodiments of this invention, coated articles herein lose no more than about 15% of their visible transmission due to HT, more preferably no more than about 10%. Moreover, monolithic coated articles herein preferably have a visible transmission after HT of at least about 50%, more preferably of at least about 60 or 75%. It is also noted that in any of the embodiments discussed above, it may be possible to provide an optional scratch resistant layer (e.g., of or including SiC or DLC—not shown) over the layer 17b. Also, while layer 11 is of or includes DLC in certain example embodiments of this invention, it is possible that layer 11 may be of a different scratch resistant material such as silicon carbide, other form of carbon, or the like in alternative example embodiments of this invention.

It is also possible for layer 17a and layer 17b to both be of or include zinc oxide in certain example embodiments of this invention. An example stack comprises a 800 nm zinc oxide based gettering layer 17a deposited using an oxygen flow rate of approximately 10 ml/kW on top of the DLC 11 followed by a second 200 nm zinc oxide based protection top layer 17b deposited using an oxygen flow rate of approximately 12 ml/kW. It has also been determined that replacing the top layer 17b with a layer deposited using an oxygen flow rate of approximately 18 ml/kW provides protection during longer tempering durations. It has also been determined that replacing the top layer 17b with a layer deposited using an oxygen flow rate of approximately 18 ml/kW followed with another layer of DLC (not shown) provides improved abrasion resistance. During tempering, the rate of oxidation of the ZnO layer 17b and the tendency for resulting oxide film to protect the more metallic layer 17a from further oxidation are related to the relative volumes of the oxide and metal.

The Pilling-Bedworth ratio, (P-B ratio) of a metal oxide (MOx) for film 17 is defined as the ratio of the volume of the metal oxide to the metal volume. For films with a ratio less than one the resulting metal oxide (e.g., zinc oxide, tin oxide, or the like) tends to be porous and non-protective because it cannot cover the whole metal surface; films with a ratio greater than two result in large compressive stress likely to exist in the metal oxide, leading to buckling and crazing. A ZnO film for example, which has a P-B ratio of approximately 1.58 when going from a metal to an oxide film and a ratio of 1.26 when going from a sub-oxide to an oxide film, when tempered expands providing a denser uniform protection layer. The film thickness of the above stack increased 5% due to it being tempered at 600° C. for 5 minutes indicating an increase in volume. Other metal oxides may also be used. In certain example embodiments, the MOx layer(s) 17a and/or 17b preferably has a P-B ratio of from about 1.1 to 1.8, more preferably from about 1.2 to 1.65.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a heat treated coated article, the method comprising:
    providing a glass substrate;
    forming at least one layer comprising diamond-like carbon (DLC) on the glass substrate;
    forming a protective film on the glass substrate over at least the layer comprising DLC thereby forming a coated surface of the glass substrate;
    determining whether the coated surface of the glass substrate is to be bent in a convex manner, to be bent in a concave manner, or to remain flat during heat treating;
    wherein the protective film is formed on the glass substrate over at least the layer comprising DLC in a manner so that oxygen content of at least part of the protective film as deposited is determined based on whether or not the coated surface of the glass substrate is to be bent in a convex manner, to be bent in a concave manner, or to remain flat during heat treating, such that at least part of the protective film has a relatively higher oxygen content in the as-deposited film when the film is to be bent in a concave manner than when the film is to be bent in a convex manner or is to remain substantially flat during heat treating; and
    heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering and/or heat bending.

2. The method of claim 1, further comprising bending the glass substrate with the layer comprising DLC and the protective film thereon during said heat treating.

3. The method of claim 2, further comprising forming an oxygen barrier layer of the protective film so as to have a relatively low oxygen content when the coated surface of the glass substrate is to be bent in a convex manner, and to have a relatively high oxygen content when the coated surface of the glass substrate is to be bent in a concave manner.

4. The method of claim 3, wherein the protective film further comprises a release layer located between the layer comprising DLC and the oxygen barrier layer.

5. The method of claim 1, wherein the protective film comprises at least one layer comprising $SnO_x$ (x is from about 0.75 to 1.5) that during the heat treating transforms into a layer comprising $SnO_y$ (y is from about 1.6 to 2.2), wherein y is greater than x.

6. The method of claim 1, further comprising exposing the protective film to a release liquid and removing at least part of the protective film after said heat treating.

7. The method of claim 1, wherein the protective film comprises a layer comprising $SnO_x$ that includes from about 0-10% Sb.

8. The method of claim 1, further comprising quenching the glass substrate with the layer comprising DLC and the protective film thereon after said heat treating, said quenching comprising using at least cool air and/or cool liquid to quench the glass substrate.

9. The method of claim 1, wherein the protective film comprises a layer comprising $SnO_x$, and the method further comprising at least prior to the heat treating providing a release layer between the layer comprising DLC and the layer comprising $SnO_x$, wherein the release layer and the layer comprising $SnO_x$ are of different materials and/or different stoichiometry relative to each other.

10. The method of claim 9, wherein the release layer comprising zinc oxide.

11. The method of claim 10, wherein the release layer comprises $ZnO_t$, where t is from about 0 to 0.9.

12. The method of claim 11, wherein t is from about 0.1 to 0.8.

13. The method of claim 9, wherein the release layer comprises an oxide of one or more of boron, titanium boride, magnesium and/or zinc.

14. The method of claim 1, wherein the layer comprising DLC is formed via an ion beam.

15. The method of claim 1, further comprising forming a barrier layer comprising silicon oxide and/or silicon nitride on the glass substrate so as to be located between at least the glass substrate and the layer comprising DLC.

16. The method of claim 1, wherein the layer comprising DLC comprises amorphous DLC and has more $sp^3$ carbon-carbon bonds than $sp^2$ carbon-carbon bonds.

17. The method of claim 1, wherein the layer comprising DLC is hydrogenated.

18. The method of claim 1, wherein the coated article is substantially transparent and is used as a shower door and/or window.

19. The method of claim 1, further comprising removing the protective film after said heat treating so that after said removing step at least part of the layer comprising DLC is exposed so as to be an outermost layer of the coated article.

20. A method of making a heat treated coated article, the method comprising:
    providing a glass substrate;
    forming at least one scratch resistant layer on the glass substrate;
    forming a protective film on the glass substrate over at least the scratch resistant layer thereby forming a coated surface of the glass substrate;
    determining whether the coated surface of the glass substrate is to be bent in a convex manner, to be bent in a concave manner, or to remain flat during heat treating;
    wherein the protective film is formed on the glass substrate over at least the scratch resistant layer so that oxygen content of at least part of the protective film as deposited is determined based on whether or not the coated surface of the glass substrate is to be bent in a convex manner, to be bent in a concave manner, or to remain flat during heat treating; and heat treating the glass substrate with the scratch resistant layer and the protective film thereon so that during the heat treating the protective film prevents significant burnoff and/or degradation of the scratch resistant layer, wherein the heat treating comprises heating the glass substrate to temperature(s) sufficient for thermal tempering and/or heat bending.

21. The method of claim 20, wherein the scratch resistant layer comprises carbon.

22. The method of claim 20, further comprising bending the glass substrate with the scratch resistant layer and the protective film thereon during said heat treating.

23. The method of claim 22, further comprising forming an oxygen barrier layer of the protective film so as to have a relatively low oxygen content when the coated surface of the glass substrate is to be bent in a convex manner, and to have a relatively high oxygen content when the coated surface of the glass substrate is to be bent in a concave manner.

24. The method of claim 23, wherein the protective film further comprises a release layer located between the scratch resistant layer and the oxygen barrier layer.

25. The method of claim 20, wherein the protective film comprises at least one layer comprising $SnO_x$ (x is from about 0.75 to 1.5) that during the heat treating transforms into a layer comprising $SnO_y$ (y is from about 1.6 to 2.2), wherein y is greater than x.

26. The method of claim 20, further comprising exposing the protective film to a release liquid and removing at least part of the protective film after said heat treating.

27. The method of claim 20, wherein the protective film comprises a layer comprising $SnO_x$ that includes from about 0-10% Sb.

28. The method of claim 20, wherein the protective film comprises at least one layer comprising $MO_x$ (x is from about 0.75 to 1.5) that during the heat treating transforms into a layer comprising $MO_y$ (y is from about 1.6 to 2.2), wherein y is greater than x, where M is a metal(s).

29. The method of claim 28, wherein M is Sn.

* * * * *